United States Patent [19]

Becker et al.

[11] Patent Number: 4,670,027
[45] Date of Patent: Jun. 2, 1987

[54] PROCESS FOR REGENERATION OF A LOADED SCRUBBING MEDIUM

[75] Inventors: Hans Becker; Horst Weiss, both of Munich, Fed. Rep. of Germany

[73] Assignee: Linde Aktiengesellschaft, Wiesbaden, Fed. Rep. of Germany

[21] Appl. No.: 826,533

[22] Filed: Feb. 6, 1986

[30] Foreign Application Priority Data

Feb. 6, 1985 [DE] Fed. Rep. of Germany ....... 3504032

[51] Int. Cl.$^4$ .............................................. B01D 53/14
[52] U.S. Cl. .......................................... 55/48; 55/49; 55/51
[58] Field of Search ...................... 55/48–51, 55/53, 54, 89

[56] References Cited

U.S. PATENT DOCUMENTS

| | | | |
|---|---|---|---|
| 2,974,750 | 3/1961 | Retallick | 55/51 |
| 3,188,287 | 6/1965 | Hull | 55/50 X |
| 3,255,572 | 6/1966 | Miller et al. | 55/50 X |
| 3,324,627 | 6/1967 | Kohrt | 55/51 X |
| 3,511,027 | 5/1970 | Roberts et al. | 55/51 X |
| 3,964,980 | 6/1976 | Ozero | 55/51 X |
| 4,038,332 | 7/1977 | Carter | 55/48 X |
| 4,050,909 | 9/1977 | Ranke | 55/48 X |
| 4,294,590 | 10/1981 | Linde et al. | 55/53 X |
| 4,332,596 | 6/1982 | Ranke et al. | 55/48 X |
| 4,530,704 | 7/1985 | Jones et al. | 55/48 |

FOREIGN PATENT DOCUMENTS 470069 12/1950 Canada ..................................... 55/51

OTHER PUBLICATIONS

Kohl et al, Gas Purification, Fourth Ed., pp. 45–46, 1985.

*Primary Examiner*—Robert Spitzer
*Attorney, Agent, or Firm*—Millen & White

[57] ABSTRACT

In a process for the regeneration of a loaded scrubbing medium in a regenerating column which is equipped with a bottoms heater and a heat condenser, the process involving stripping the loaded scrubbing medium with a vapor, wherein after condensation of the vapor in the head condenser the stripped-out components are removed and the remaining condensate is reintroduced to the regenerating column, the improvement comprising that the condensate, prior to being reintroduced to the regenerating column, is at least partially revaporized in a vaporizer and at least a portion of the condensate, prior to its at least partial revaporization in said vaporizer, is recycled into the regeneration column to a section located above the entrance point for the loaded scrubbing medium, is withdrawn again still above the entrance point for the loaded scrubbing medium, and is then passed to said vaporizer.

8 Claims, 2 Drawing Figures

4,670,027

PROCESS FOR REGENERATION OF A LOADED SCRUBBING MEDIUM

BACKGROUND OF THE INVENTION

This invention relates to a process for the regeneration of a loaded scrubbing medium in a regenerating column equipped with a bottoms heater and a head condenser, the process involving stripping the loaded scrubbing medium with a vapor, wherein after condensation of the vapor in the head condenser the stripped-out components are removed and the remaining condensate is reintroduced into the regenerating column.

DESCRIPTION OF THE PRIOR ART

In many chemical and physical scrubbing operations, regeneration of the loaded scrubbing medium, typically a liquid solvent, takes place by stripping with a vapor produced, e.g., by vaporization of a component contained in the scrubbing medium. Usually steam is employed for this purpose, as in processes using chemical absorbents like aqueous solutions of alkanolamines or alkali -carbonates or in processes using physical solvents like ethers of polyethylene glycols.

The usage of other materials is also possible, such as, for example, methanol or other hydrocarbons. Regeneration in these systems is customarily performed as follows. The regenerating column consists of two sections: the lower section is the actual regenerating section while the upper section functions to rewash the residues of scrubbing medium contained in the stripping vapor. The loaded scrubbing medium is introduced between the two sections. The vapor required for stripping is produced by supplying heat in the bottoms. After condensation of the vapor in the head condenser, the components, i.e., impurities which have been stripped out of the scrubbing medium, are withdrawn in the gaseous phase from the system. The remaining condensate is returned as reflux into the upper column section and is mixed, after passing through this section, with the loaded scrubbing medium. Frequently, a partial stream of condensate is removed and utilized for rewashing of scrubbing medium at the head of the nearby absorber. After traversing this section, the condensate is likewise mixed in with the scrubbing medium.

Representative examples of such processes are described e.g. in "Gas Purification" by A. Kohl and F. Riesenfeld, Gulf Publishing Company.

Mixing the condensate with the scrubbing medium is subject to the following drawbacks: (a) the mixture of condensate and scrubbing medium has a higher boiling point than the pure condensate stream, (b) it boils at a varying temperature, and (c) the temperature in the regenerating section lies markedly below the bottoms temperature. Both temperature differences depend strongly on the characteristics of the system. In a normal application the first one can be up to 30° C. or even more, the latter up to 10° C.

OBJECTS OF THE INVENTION

Accordingly, it is an object of this invention to provide an improved process of the aforementioned type wherein the above-discussed disadvantages are easily, effectively and economically overcome in a simple manner.

SUMMARY OF THE INVENTION

These and other objects have been attained in a process for the regeneration of a loaded scrubbing medium in a regenerating column which is equipped with a bottoms heater and a head condenser, the process involving stripping the loaded scrubbing medium with a vapor, wherein after condensation of the vapor in the head condenser the stripped-out out cmponents are removed and the remaining condensate is reintroduced to the regenerating column, the improvement wherein the condensate, prior to being reintroduced to the regenerating column, is at least partially, e.g. by more than 30 mol % revaporized.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

DETAILED DISCUSSION

Figure 1:
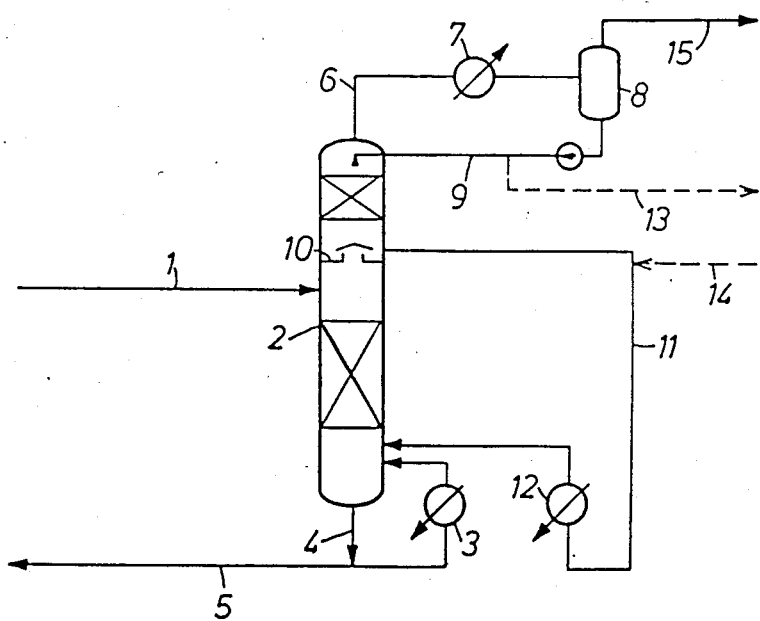
FIG. 1 is a schematic outline of a preferred embodiment of the process.

A major result of the development of the process of this invention is improvement of the thermodynamics; e.g., the vaporization enthalpy which is required for the stripping medium (i.e. the vaporized condensate) can be supplied at a lower temperature and thus in a more favorable, i.e., efficient, thermodynamic manner. According to the prior art, the vaporization enthalpy has to be supplied at the temperature of the bottoms, because the condensate was mixed with the loaded scrubbing medium. Following the ideas of this invention, the pure condensate is at least partially vaporized and the vapor used as stripping medium. Thus the enthalpy of vaporization has to be supplied at the boiling temperature of the condensate, which is lower than the bottoms temperature.

Furthermore, the temperature in the regenerating section is in closer proximity to the bottoms temperature (assumed to be substantially constant), thus enabling either a lesser amount of stripping vapor or less mass transfer units (lower number of theoretical plates) to be required, in the regenerating section of the column.

In one preferred embodiment, it is especially advantageous to introduce at least a portion, e.g., about 20 to 80%, of the condensate, prior to its at least partial vaporization, as reflux into a section of the regenerating column located above the entrance point for the loaded scrubbing medium, later withdrawing this portion at a point positioned again still above the entrance point for the loaded scrubbing medium and, finally, feeding this portion to the vaporizer. As mentioned above, the remaining portion, e.g., about 20 to 80%, of the condensate is frequently conducted to a nearby absorber unit for rewashing of the scrubbing medium. During this step, this partial stream is introduced, as reflux into a section of the scrubbing column located above the entrance point for the regenerating scrubbing medium, and preferably is again withdrawn still above the entrance point for the regenerated scrubbing medium and is then passed to the vaporizer.

In this way, the condensate utilized for the scrubbing medium rewashing is prevented from intermixing with the scrubbing medium in the absorber.

Preferably, the at least partial vaporization of the condensate is performed by heat exchange with compressed vapor from the head of the regenerating column. In this embodiment, the compressed vapor is preferably utilized as a heat source for the bottoms heater of the regenerating column before transferring its heat to the condensate. This version can thus be understood to represent a coupling of the process according to the invention with a heat pump whereby the required amount of energy expended by the process is reduced.

The process of this invention can be employed for the regeneration of substantially all conventional scrubbing media, e.g., in chemical scrubbing operations, such as hot potash, monoethanolamine or diethanolamine, in physical scrubbing procedures utilizing e.g. polyethylene glycol ethers or methanol and in hybrid scrubbing operations utilizing mixtures such as alkanolamine and methanol.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

DETAILED DESCRIPTION OF THE DRAWINGS

As can be seen in FIG. 1, a loaded scrubbing medium is passed in conduit 1 and introduced into the center of regenerating column 2. Column 2 is equipped with a bottoms heater 3 and a head condenser 7. After regeneration of the scrubbing medium by stripping with vapor rising from the bottoms, the scrubbing medium is withdrawn via conduit 4; a small fraction thereof is recycled by way of the sump heater 3 into the column 2 bottoms while the major fraction of regenerated scrubbing medium is removed via conduit 5 and passed on, e.g., to a scrubbing stage.

The stripping vapor containing the stripped-out components leaves the column 2 overhead by way of conduit 6, is partially condensed in 7, and introduced into phase separator 8. In the separator the stripped-out gas is removed from the system via conduit 15, while the condensate is withdrawn via conduit 9 and introduced as reflux into the upper column section.

In order to prevent a mixing of condensate with the scrubbing medium, a chimney tray 10 is positioned in the upper section of column 2 above the entrance point for the loaded scrubbing medium, thus permitting the condensate to be removed via conduit 11 at a location above the chimney tray. After being heated and at least partially, e.g., 30 to 100%, preferably more than 50%, preferably more than 80%, vaporized in vaporizer 12, the condensate is then reintroduced into the column bottoms.

As indicated by the dashed lines, a portion of the condensate in conduit 9 can be conducted via conduit 13 to e.g., an absorber (not shown). This partial stream, after, e.g. having been used as reflux in the absorber, is removed and admixed via conduit 14 with the condensate in conduit 11 that has been withdrawn from column 2, prior to the combined streams heating and at least partial vaporization in 12 followed by reintroduction into column 2.

Figure 2:
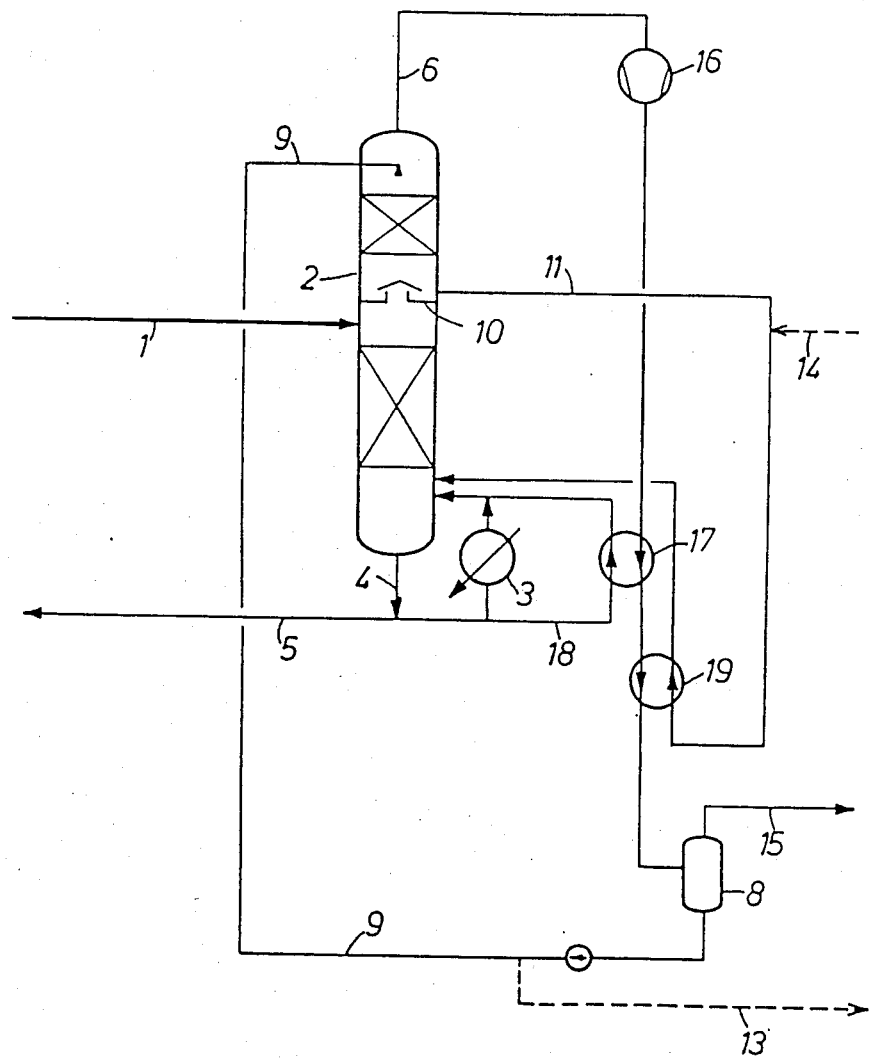
FIG. 2 is a more preferred embodiment of the process wherein the vapor discharged from the head of the regeneration column is compressed and then condensed by heat exchange with both a bottoms stream and the condensate stream being recycled to the regeneration column.

As is seen in FIG. 2, the parts of the integrated system which are the same as the embodiment in FIG. 1 are identified with the identical reference numerals.

Via conduit 1, an $SO_2$-loaded, tetraethylene glycol-dimethyl ether stream in amount of 900 m$^3$/h at 35° C. and 06 bar flows from the absorption section of a flue gas scrubbing unit and is introduced into the center of the regenerating column 2. The impurities are striped out of the loaded scrubbing medium by means of 890 Kmol/h water vapor. The thus-regenerated scrubbing medium is withdrawn from the sump via conduits 4 and 5, and returned to, e.g., the absorption section.

In conduit 6, about 1000 kmol/h of water vapor containing 70 kmol/h of stripped-out gases, primarily $SO_2$ and $CO_2$, are removed at a temperature of 86° C. and a pressure of 0.6 bar. The vapor is compressed in compressor 16 to 1.6 bar, cooled in heat exchanger 17 by thermal contacting against scrubbing medium from conduit 18 to 110° C., followed by contacting in heat exchanger 19 against condensate from conduit 11, thus being partially condensed and cooled to about 90° C. and then conducted to phase separator 8. In separator 8, the condensed water is withdrawn and introduced, via conduit 9, to column 2 as reflux Via conduit 15, about 120 kmol/h of residual gas is withdrawn in the overhead from separator 8. About 900 kmol/h of condensate is removed in stream 11 from the column 2 above the flue plate 10 at a temperature of about 84° C., vaporized to about 90% in heat exchanger 19, and introduced into the sump of column 2.

As in example 1, it is also possible in this example to conduct, via conduit 13, a fraction, for example 400 kmol/h, of the condensate stream as reflux to the absorber and then admix the same again, via conduit 14, at a temperature of 25° C. to the condensate stream in conduit 11.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the regeneration of a loaded scrubbing medium in a regenerating column comprising a regeneration section having an entrance point for loaded scrubbing medium the process involving stripping the loaded scrubbing medium with a vapor, wherein after condensation of the vapor in a condenser, the stripped-out components are removed for resultant condensate and the remaining condensate is reintroduced to the regenerating section, the improvement wherein the condensate, prior to being reintroduced to the regenerating section, is recycled to the regeneration column to a washing section located above the regeneration section, said condensate being withdrawn from said washing section and delivered to a vaporizer wherein said condensate is at least partially revaporized, the partially revaporized condensate being reintroduced to said regeneration section.

2. A process according to claim 1, wherein a portion of the condensate is introduced, prior to its at least partial revaporization, into a scrubbing column to a section located above an entrance point for regenerated scrubbing medium, is withdrawn again still above the entrance point for regenerated scrubbing medium, and is then passed to the vaporizer.

3. A process as claimed in claim 2 wherein the amount of condernate introduced into the scrubbing column in about 20 to 80%.

4. A process according to claim 1, wherein the at least partial revaporization of the condensate is accomplished by heat exchange with a compressed vapor stream from the head of the regeneratig column.

5. A process according to claim 4, wherein the compressed vapor stream, prior to heat exchange with the condensate, is utilized as a heat source for the bottoms heater of the regenerating column.

6. A process according to claim 4, wherein the compressed vapor stream from the heat of the regenerating column is cooled in heat exchange with scrubbing medium, which is recycled after the heat exchange, and condensate streams before being phase separated, with the formed condensate from the phase separation being passed to the head of the regeneration column.

7. A process according to claim 1, wherein the amount of partially revaporized condensate ranges from 30 to 100%.

8. A process according to claim 1, wherein the portion of condensate recyled to the washing section is about 20 to 80%.

* * * * *

UNITED STATES PATENT AND TRADEMARK OFFICE
CERTIFICATE OF CORRECTION

PATENT NO. : 4,670,027

DATED : June 2, 1987

INVENTOR(S) : Hans Becker et al

It is certified that error appears in the above-identified patent and that said Letters Patent is hereby corrected as shown below:

column 5, Claim 3, Line 17:

reads: "amount of condernate introduced into the scrubbing"

should read: --amount of condensate introduced into the scrubbing--

Column 6, Claim 4, Line 2:

reads: "stream from the head of the regeneratig column."

should read:--stream from the head of the regenerating column.--

Column 6, Claim 8, Line 18:

reads: "tion of condensate recyled to the washing section is"

should read: --tion of condensate recycled to the washing section is--

Signed and Sealed this

Eighth Day of September, 1987

*Attest:*

DONALD J. QUIGG

*Attesting Officer*     *Commissioner of Patents and Trademarks*